(12) United States Patent
Morrison

(10) Patent No.: US 8,020,596 B1
(45) Date of Patent: Sep. 20, 2011

(54) HIGH EFFICIENCY INTEGRATED AUTOMOTIVE WHEEL

(76) Inventor: Glenn Arthur Morrison, Momence, IL (US)

( * ) Notice: Subject to any disclaimer, the term of this patent is extended or adjusted under 35 U.S.C. 154(b) by 596 days.

(21) Appl. No.: 12/288,046

(22) Filed: Oct. 16, 2008

(51) Int. Cl.
  B60C 5/20 (2006.01)
  B60C 5/22 (2006.01)
  B60C 5/24 (2006.01)

(52) U.S. Cl. ............... 152/340.1; 152/331.1; 152/339.1

(58) Field of Classification Search ............... 152/331.1, 152/339.1, 340.1, 341.1, 342.1, 343.1, 344.1, 152/345.1
See application file for complete search history.

(56) References Cited

U.S. PATENT DOCUMENTS

| | | | |
|---|---|---|---|
| 580,884 A | 4/1897 | Murphy | |
| 2,293,907 A | 8/1942 | LeBus | |
| 2,572,594 A | 10/1951 | Bushemi | |
| 4,241,775 A | 12/1980 | Jackson | |
| 4,280,546 A | 7/1981 | Mistretta | |
| 4,293,017 A | 10/1981 | Lambe | |
| 4,371,023 A | 2/1983 | Campagna | |
| 4,418,734 A | 12/1983 | Dobson | |
| 4,922,981 A | 5/1990 | Pompier | |
| 5,067,932 A | 11/1991 | Edwards | |
| 5,109,905 A | 5/1992 | Lambe | |
| 5,236,055 A | 8/1993 | Legal | |
| 5,885,383 A | 3/1999 | French | |
| 6,470,935 B1 | 10/2002 | Fulsang | |
| 7,100,654 B2 | 9/2006 | Boiocchi et al. | |
| 2008/0135153 A1* | 6/2008 | Sawada | 152/516 |

* cited by examiner

Primary Examiner — Khanh P Nguyen
Assistant Examiner — John Blades

(57) ABSTRACT

The present device is an integrated automotive wheel for electric vehicles which substantially reduces energy loss due to tire flex and energy loss from a conventional drive train. The wheel includes an axle, a hub, two composite sidewalls, a low pressure inner chamber with shock absorbing hub protector, and at least one outer high pressure pneumatic chamber with tread. The hub can contain an electric hub motor which rotates the wheel, propelling the vehicle. The sidewalls include at least one pressurized chamber which position the outer tread ring and enable the wheel to simulate an energy efficient high pressure pneumatic wheel, experiencing little deformation when under smooth road conditions. When road conditions are rough, the sidewalls can temporarily buckle in response to the increased road forces, simulating a low pressure conventional tire having ample space for deformation, with suspension and shock absorption capability built in. The sidewalls and outer ring chamber can be filled with high pressure closed cell foam to prevent flats.

18 Claims, 4 Drawing Sheets

HIGH EFFICIENCY INTEGRATED AUTOMOTIVE WHEEL

CROSS-REFERENCE TO RELATED APPLICATIONS

The outer ring, hub protector and hub motor derive from the previous application of Ser. No. 11/769,566, filed 2007 Jun. 27, prepared by David J. Bremer, Reg. # 51497, for the present inventor.

FEDERALLY SPONSORED RESEARCH

Not Applicable

SEQUENCE LISTING OR PROGRAM

Not Applicable

FIELD OF INVENTION

The present invention relates to automotive wheels and, more particularly, to energy-efficient automotive wheels.

BACKGROUND

In the late 19th and early 20th centuries, the design of automotive wheels was based on that of bicycle tires, having thin walls with high pressure and narrow profiles. The advantage of this, important at that time, was high energy efficiency with low energy loss due to tire flex. Disadvantages were a hard ride and frequent punctures. As time went on, engines became more powerful and fuel became less expensive. Freedom from flats and ride comfort took top priority, leading to wider, lower pressure, thicker tires. These tires involved greater energy loss mainly due to tire flex at and near the area of contact with the road. Recently however, energy conservation has once again become of prime importance. The need for higher energy efficiency in the wheel, among other automotive subsystems, is paramount.

Numerous approaches to increasing the effectiveness of electric and hybrid vehicles have been implemented: shaping the vehicle to reduce aerodynamic drag, larger battery capacity, and regenerative braking are among them. These approaches are effective as far as they go. However, little has been done to remedy a serious source of wasted energy in vehicles: the process of vehicle kinetic energy being converted to heat due to tire flex.

Under smooth road conditions, the ideal energy conserving tire has thin walls and is inflated to high pressure. The tire is supported by the rim which functions as a rigid support. A narrow high pressure bicycle tire is an example. A small amount of tire flex occurs at or near the road contact, leading to low energy losses.

Under rough conditions with large road obstructions, shock absorption and cushioning are the major requirements, that only a low pressure, large chambered tire can satisfy. Conventional automotive tires meet these requirements well. These tires rely on one inflated low pressure thick-walled air chamber for operation on both smooth and rough roads. Thus a conventional tire is largely biased towards cushioning on rough roads, while sacrificing the energy saving characteristics of narrow high pressure tires.

Past attempts have been made to design multichambered pneumatic tires with energy-conserving features. U.S. Pat. No. 5,109,905 (Lambe) discloses a two-chambered tire, with the goal of reducing tire flex and conserving energy. An outer high pressure tread chamber is intended to simulate a high pressure pneumatic tire. An inner low pressure chamber is intended to simulate a conventional low pressure tire with cushioning effect. However, Lambe's tire would result in at most a small improvement in efficiency over a conventional tire, for two reasons. Without internal restraint bands to position the outer chamber relative to the hub, a very high outer chamber pressure would be required to stiffen the tread sufficiently to adequately reduce tire flex at and near the road contact. There is nothing present that enables simulation of the rigid support provided to a narrow high pressure tire by its rim. Also, even if the outer chamber were stiffened substantially, without internal restraint bands the outer chamber would not remain centered on the rotational axis; thus the sidewalls would flex to about the same extent as with a conventional tire. Much of the outer chamber would move vertically in response to a road obstruction, possibly leading to an actual reduction in efficiency. The outer chamber may have increased stiffness because of the high pressure, but the restoring force profile (i.e. the restoring force as a function of tire deformation) is similar to that of a conventional automotive tire. As a result the Lambe tire cannot truly and effectively simulate a high pressure pneumatic tire on a smooth road.

References to multi-chambered tires for the purpose of reducing the effects of punctures occur, for example in U.S. Pat. No. 6,470,935 (Fulsang), U.S. Pat. No. 2,572,594 (Bushemi), and U.S. Pat. No. 580,884 (Murphy). These examples make no reference to energy saving features.

References to hub protectors exist, for example U.S. Pat. No. 7,100,654 (Boiocchi, et al), U.S. Pat. No. 5,885,383 (French), and U.S. Pat. No. 4,922,981 (Pompier). These devices serve to reduce damage to the hub and rim after a puncture, but are not designed to function as shock absorbers or suspensions.

The present device features a tire which meets the requirements for rough and smooth roads in such a manner that each of the two requirements comes into play only when required by the specific road condition. Thus each of the two requirements can be met separately and optimally. On a smooth road, internal restraint bands hold the outer high pressure chamber in a position concentric with the hub and axle. On a rough road, that part of the tire near the road contact buckles inward toward the hub, bringing the cushioning effect of the low pressure chamber and the pressurized sidewalls into play. Additional reductions in energy consumption can be gained by incorporating an electric hub motor, which reduces or eliminates the need for the typical drive train implemented between the engine and the conventional wheel.

The previous attempts at producing a tire design combining the advantages of energy conservation on smooth roads and cushioning on rough roads have proven inadequate. The present device however, meets these requirements and more: (1) simulation of a high pressure pneumatic tire on smooth roads, (2) simulation of a cushioning effect of a conventional low pressure tire on rough roads, (3) functioning as a shock absorber and suspension on rough roads, and (4) safety features to mitigate the effect of punctures.

OBJECTS OF THE INVENTION

It is therefore an object of the invention to reduce energy loss in automotive wheels due to tire flex.

It is another object of the invention to simulate an energy-efficient high pressure pneumatic tire on smooth roads.

It is another object of the invention to simulate a low pressure cushioning tire on rough roads, providing an internal suspension and shock absorber for ride comfort and to protect the hub.

It is another object of the invention to provide an internal suspension and shock absorber to reduce energy loss due to road-induced vertical motion of the wheel, to reduce need for external suspension.

It is another object of the invention to reduce energy loss due to a complex drive train by utilizing an electric hub motor.

It is another object of the invention to provide a flat-resistant tire.

SUMMARY

The present device is an integrated automotive wheel for electric vehicles which substantially reduces energy loss due to tire flex and energy loss from a conventional drive train. An embodiment of the device includes a hub, two composite sidewalls, a low pressure inner chamber containing a hub protector, and a high pressure pneumatic outer ring with tread. An embodiment may include an electric hub motor which rotates the hub and tire, propelling the vehicle. The sidewalls contain at least one high pressure chamber which position the outer ring and enable the wheel to simulate an energy efficient high pressure pneumatic wheel, experiencing little deformation when under smooth road conditions. The outer ring and sidewalls can be filled with closed cell foam to prevent tire flats and improve stiffness. When road conditions are rough, the sidewalls can temporarily buckle in response to the increased road forces, simulating a conventional tire having ample space for deformation, with suspension and shock absorption capability built in. An embodiment can include one or more ring restraint bands in the low pressure chamber for better control of the restoring force on the outer ring when the outer ring is deformed. An embodiment can include an automatic device for maintaining the correct gas pressure in the low pressure chamber.

DESCRIPTION OF AN EMBODIMENT OF THE PRESENT DEVICE

Figure 1:
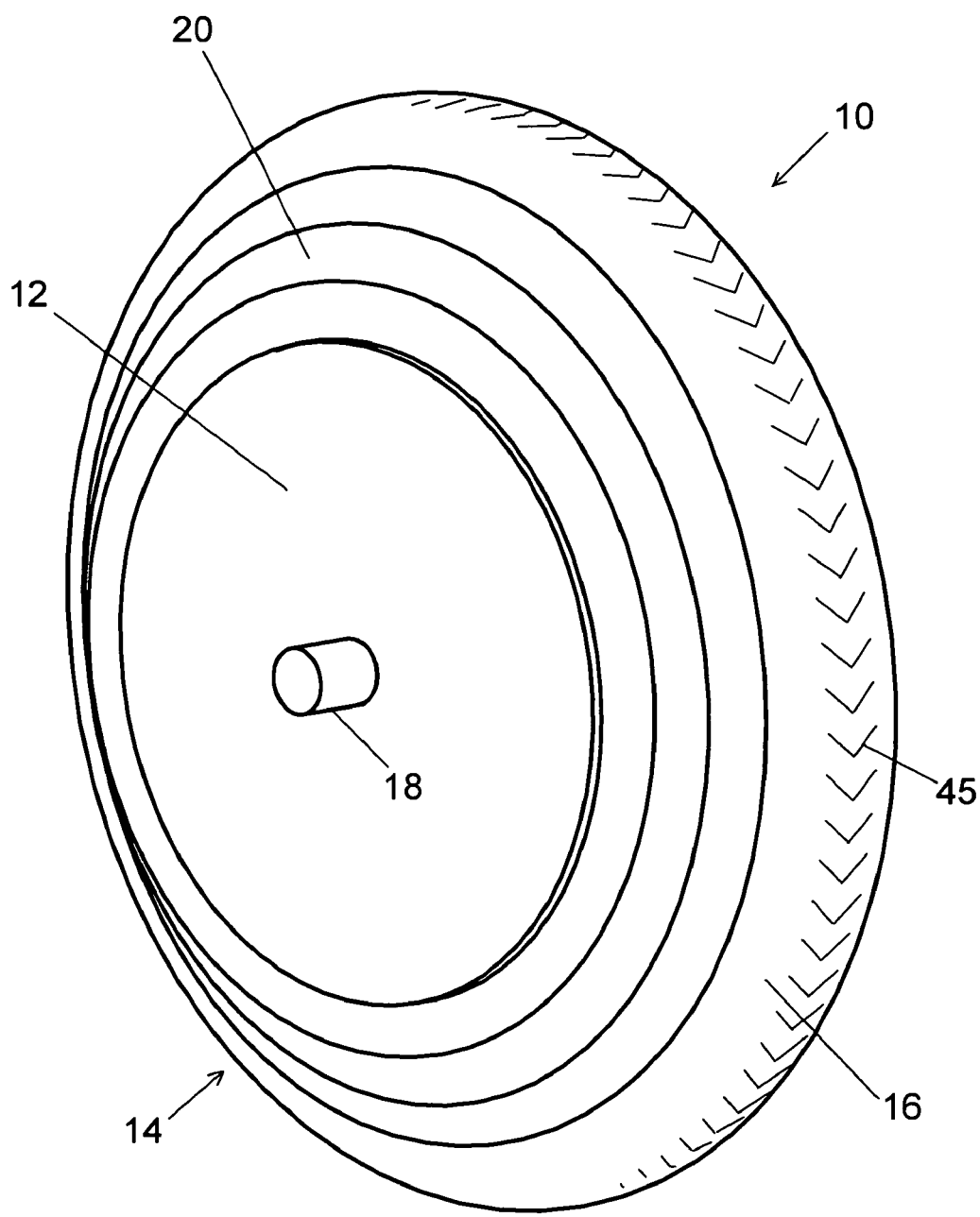
FIG. 1 is a perspective view of an embodiment of the present device.
Figure 2:
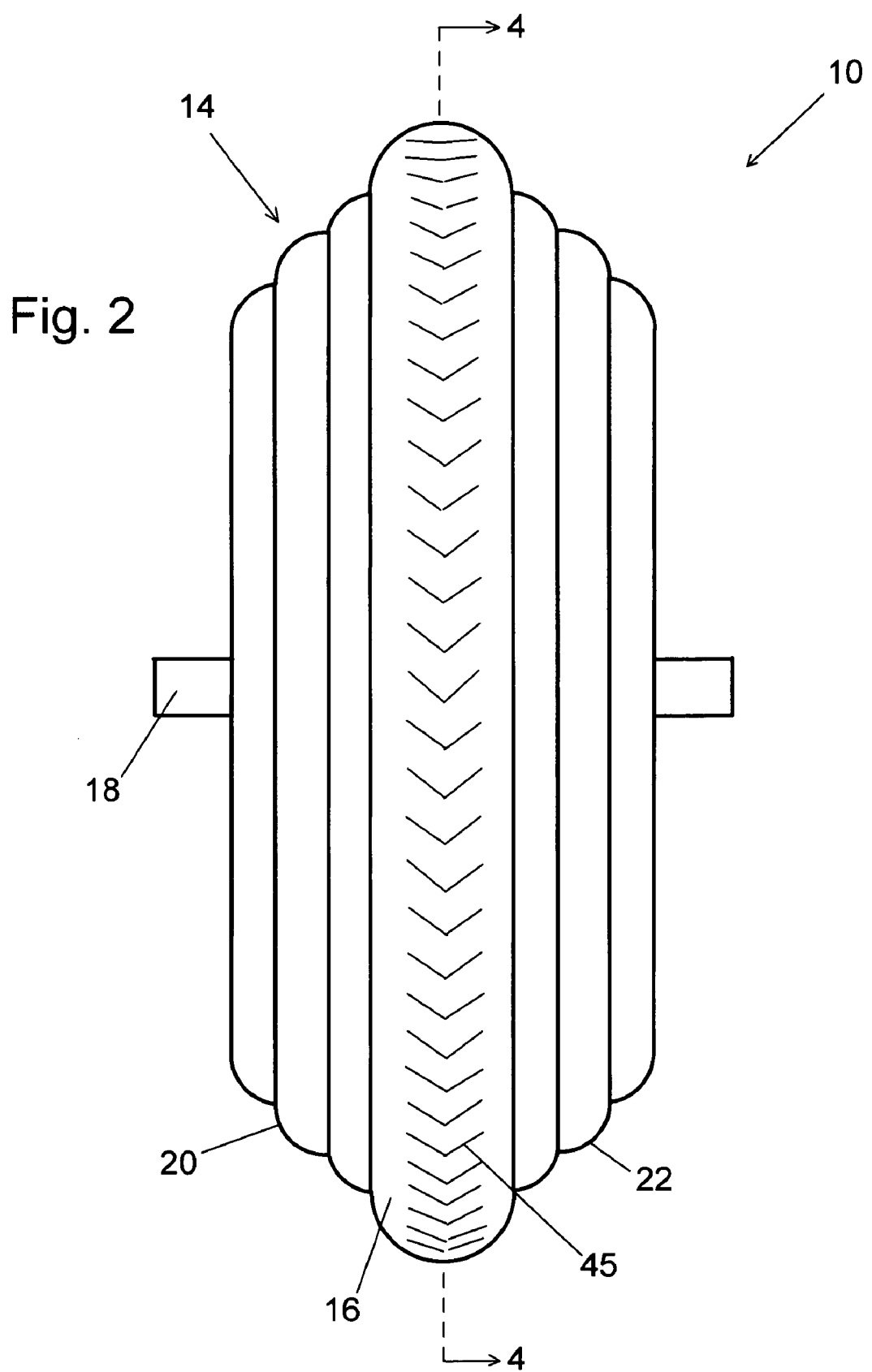
FIG. 2 is a front view of the embodiment.
Figure 3:
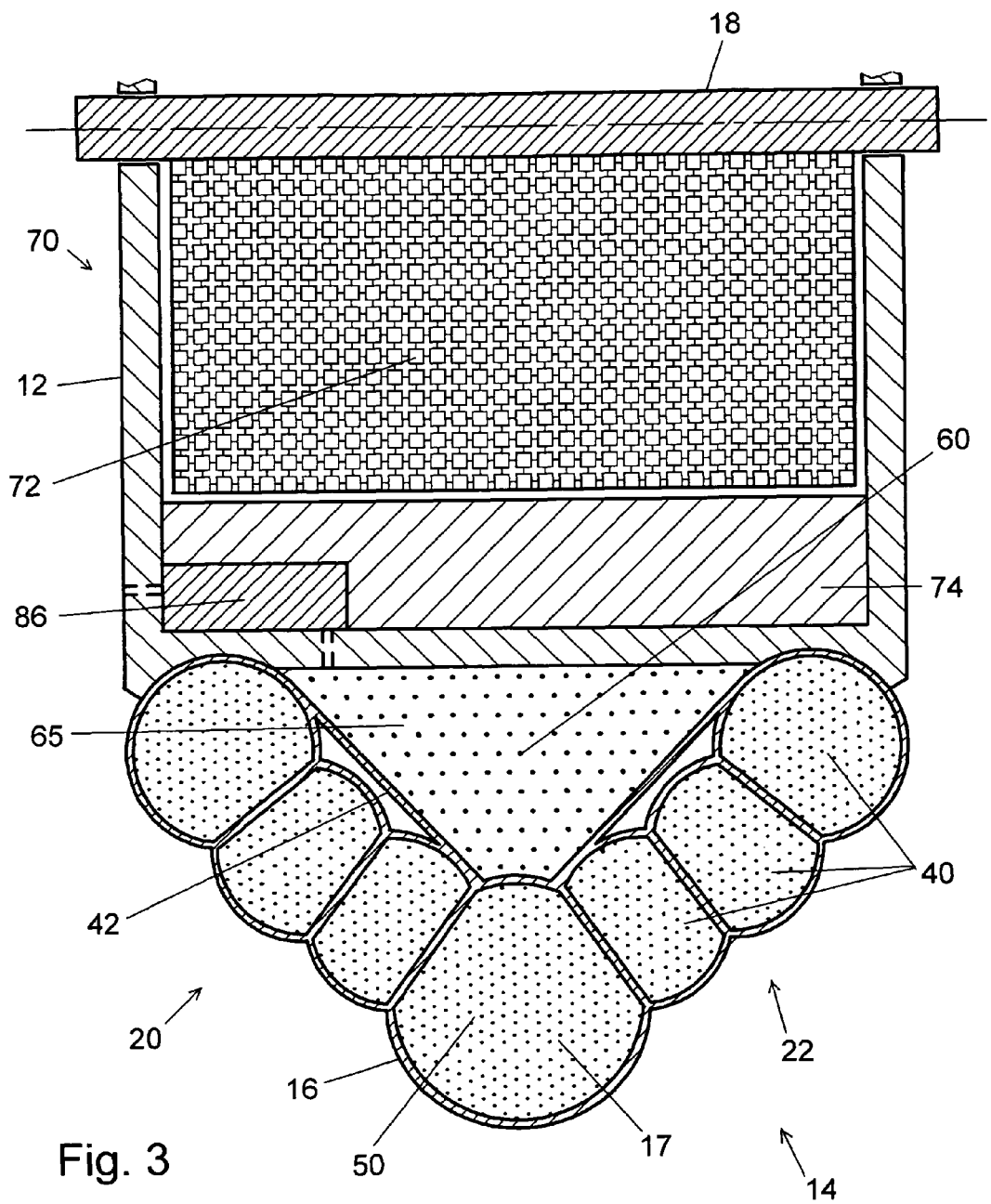
FIG. 3 is a section view of the embodiment along a plane extending outward from the axis of rotation, including the entire wheel axle.
Figure 4:
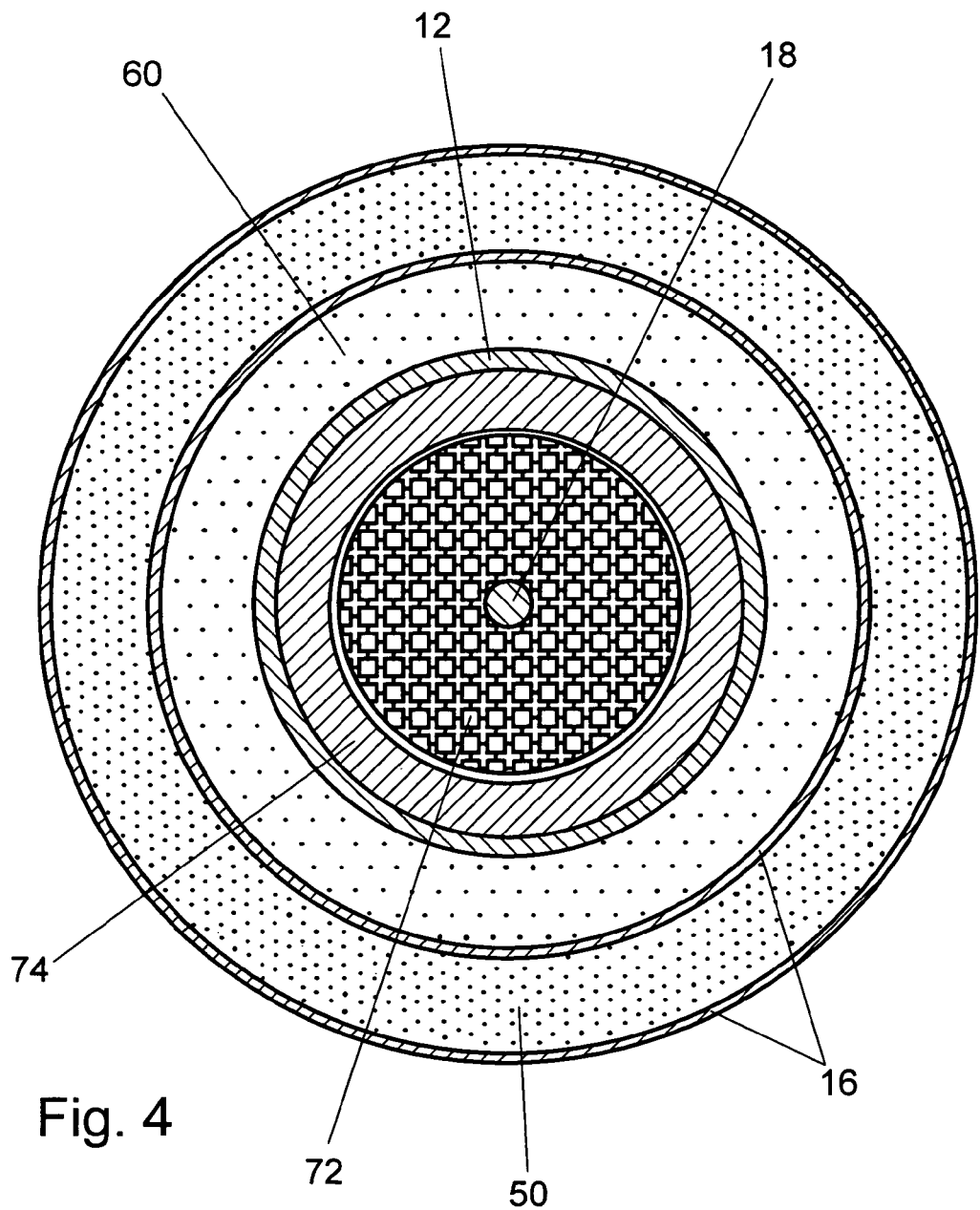
FIG. 4 is a section view taken along the plane of line 4-4 of FIG. 2.

The integrated wheel 10 is an energy-efficient wheel for automotive use. It is an automotive wheel that performs like a high pressure bicycle wheel where the road is smooth and acts like a low pressure conventional cushioning wheel where the road is rough. To accomplish this goal, the present device incorporates a high pressure section for simulating a high pressure tire and a low pressure section which enables simulation of a cushioning tire. A conventional automotive suspension requires the entire wheel to move vertically in response to a road obstruction, generating a large kinetic energy that must be dissipated into heat by the suspension and shock absorber. The present device, on the other hand, requires only a local portion of the tire to deform, resulting in much less kinetic energy to be dissipated. When an electric hub motor is included in the present device, the weight of external wheel bearings and suspensions can be reduced, the conventional drive train and transmission can be eliminated, and space is saved in the vehicle body which can be devoted to passengers and cargo.

The integrated wheel 10 provides a combined wheel, propulsion and suspension with high energy efficiency for electric and hybrid vehicles. The purpose of the integrated wheel is to aid in overcoming the lack of energy efficiency of modern automotive wheels by reducing energy loss due to tire flex, and by reducing the need for the drive train linking engine and wheel.

An embodiment of the integrated wheel 10 includes a pneumatic multi-chambered tire 14 attached to a wheel hub 12, which rotates about a stationary wheel axle 18. The tire includes a non-porous high pressure pneumatic outer ring 16 which contacts the road surface. The outer ring encircles the hub and is radially spaced apart from the hub. At least one continuous high pressure ring chamber 17 is located within the outer ring 16.

The outer ring 16 is pressurized with air or other gas, and can be substantially toroidally shaped, for example with circular cross section, elliptical cross section, etc. The overall dimensions of the integrated wheel are approximately the same as those of a conventional wheel.

A non porous first sidewall 20 and non porous second sidewall 22 are axially spaced apart and encircle the wheel hub 12. The two sidewalls connect the outer ring 16 to the wheel hub 12, positioning the outer ring concentrically to the hub. The outer ring, sidewalls, and the hub enclose a low pressure chamber 65. Each sidewall contains at least one high pressure sidewall chamber 40 encircling the hub. The present embodiment has three such chambers in each sidewall.

The tire 14 is designed to accommodate various road conditions, including smooth and rough pavement, potholes, and gravel. On a smooth road, or a road with small irregularities, the tire remains in substantially unflexed (rigid) mode. In this mode the outer ring 16 stores and releases the associated energies by deformation of its outer surface where it contacts the road, and the wheel has rolling resistance approaching that of a high pressure pneumatic bicycle tire. When encountering larger road obstructions, the sidewalls and the outer ring 16 buckle toward the hub, and the hub protector 60, which encircles the hub and is located in the low pressure chamber 65, acts as a cushion and may act as a shock absorber. It may absorb part of the resulting kinetic energy and convert it to heat. Overall energy efficiency is not significantly reduced by the hub protector's action, since large road obstructions are relatively infrequent.

The outer ring 16 may have belting made of poly-para-phenylene terephthalamide (Kevlar®) or similar high strength, low extensibility material. The number of separate chambers in the outer ring is not critical; the present embodiment has one chamber. The outer ring 16 contains resilient closed cell foam 50 to prevent flats and reduce kinking when the ring buckles. The outer ring 16 may have a tread 45 on its outer surface.

With small road obstructions the sidewalls remain substantially undeformed. The outer ring 16 stores and releases energy from small road obstructions in the same way as a pneumatic bicycle tire. This occurs by deformation of the tread surface of the outer ring where it contacts the road, as in a bicycle tire. Larger road obstructions cause the outer ring 16 and sidewalls to buckle. The buckling transfers the energy storage and release function to the deformable sidewalls and the hub protector 60 section of the wheel. The high pressure in the outer ring 16 itself, the high pressure in the sidewalls, and the azimuthal tensional force in the outer ring caused by the low pressure chamber 65, provides the stiffness required to resist buckling below the predetermined threshold road pressure. The high gas pressure in the outer ring 16 and sidewalls is predetermined so that a small additional force exerted by the road (beyond that exerted by a smooth road surface) on the outer ring is sufficient to deform and buckle the outer ring. When the outer ring 16 buckles toward the hub, the low pressure section of the tire (hub protector) 14 acts as a shock absorber and a cushioning support for the vehicle. The energy-conserving function of the wheel is in this way critically dependent on the pressure difference between the high and low pressure compartments.

The first sidewall 20 and second sidewall 22 position the outer ring 16 and provide restoring force to the outer ring when the outer ring and sidewalls are deformed or buckled by road obstructions. The sidewalls limit azimuthal motion of the outer ring 16 relative to the other parts of the wheel and are internally pressurized. The sidewalls can be made with casing of materials such as rubber or urethane, with high tensile strength inelastic belting, for example poly-para-phenylene terephthalamide, and containing high gas pressure. The high internal pressure of the sidewalls provides stiffness which enables the sidewalls to buckle towards the hub in response to a predetermined deforming force exerted by the road acting through the outer ring 16. The sidewalls are curved outward slightly. An important purpose of this is to ensure outward buckling of the sidewalls and to prevent inward buckling. The restoring force activated by sidewall buckling is predetermined to begin at a level slightly greater than the vehicle weight on that wheel. The restoring force per unit length of tire circumference remains approximately constant during the buckling process.

Resistance to axial motion of the outer ring 16 is approximately proportional to the spacing of the two sidewalls at their hub attachment. To maximize this resistance it is desirable to maximize the spacing of the sidewalls where they are attached to the hub.

The outer ring 16 may be restrained radially and axially by one or more ring restraint bands 42. The present embodiment has two ring restraint bands. The bands encircle the hub and are located in or near the low pressure chamber. Each ring restraint band 42 extends from the wheel hub 12 or a location at a sidewall near the hub, to the outer ring 16 or a location at a sidewall near the outer ring. A ring restraint band may be contiguous with a sidewall. The ring restraint bands can be made of poly-para-phenylene terephthalamide or material with similar properties. The bands may have a porous or open meshed structure to reduce wear due to shearing forces, and to prevent pressure gradients across the band. The ring restraint band 42 may induce an outward curvature of the sidewall to prevent the sidewall from buckling inward toward the wheel hub 12. In this manner the ring restraint band bends the sidewall to a predetermined degree allowing the sidewall to provide to the outer ring 16 a nearly constant restoring force per unit length of tire circumference, beginning when a substantial part of the outer ring is buckled or deformed towards the wheel hub by a road obstruction. The ring restraint band 42 enables the outer ring 16 to resist deformation (except at the point where it contacts the road) at any road force less than a predetermined threshold force which is slightly greater than the resting vehicle weight for that wheel. The restoring force on the outer ring increases gradually as the buckling deformation increases. This allows a relatively large deformation of the outer ring 16 towards the hub for a given deforming force, enhancing the suspension and cushioning function of the wheel.

The restraint bands 42 can be connected to other parts of the wheel by methods including but not limited to, sewing, adhesive bonding, and thermal welding. The ring restraint bands are flexible, strong and substantially inelastic.

High pressure closed cell foam 50 may be used to fill the outer ring 16 and both sidewalls. The foam mitigates the effect of punctures, prevents flats and reduces kinking when the outer ring buckles from the effect of road obstructions. The foam may consist of urethane or similar material.

The hub protector 60 is a ring encircling the hub which may be made wholly or partially, of open cell, low-resilience foam. It may be made of polymer or similar material and can have various cross-sectional shapes. The hub protector is located within the low pressure chamber 65, between the two sidewalls and between the hub and outer ring 16. The hub protector may have high mechanical hysteresis, meaning that the restoring force during the outer ring's return to circular shape is less than the force during the deformation, the energy difference being converted to heat. In this way the hub protector 60 may serve as a shock absorber, cushioning impacts delivered to the wheel from road obstructions. Only large road obstructions activate it. If the high pressure or low pressure tire sections are damaged, the hub protector enables driving the vehicle a short distance without damaging the hub.

If the ring restraint bands 42 are not present, the low pressure in the hub protector 60 may serve to prevent the sidewalls from bowing inward.

The integrated wheel 10 may include an electric hub motor 70. The hub motor may include a stator 72 attached to the wheel axle 18, and a rotor 74 attached to the wheel hub 12. For long life, the electric hub motor may be of a DC brushless type designed for operation with a voltage controller.

At low speeds, ohm losses in the windings of a hub motor without gear reduction become large compared to the mechanical output power, causing loss of efficiency. For this reason the hub motor may be provided with a planetary gear reduction system to enable the electric motor to run at a higher, more efficient speed, while providing a lower mechanical output rotation speed to the hub and tire.

The advantages of the planetary gear system are higher torque at all speeds, moderate to good efficiency at low speeds, and the possibility of shifting between different gear ratios. In conventional planetary gear systems, when gear teeth and rollers mesh, their surfaces are in relative motion, thus creating friction and energy loss. Bicycle chains reduce this problem by using rollers whose surfaces contact the sprocket teeth while rotating on their lubricated cores to reduce relative surface motion of roller and tooth. The relative motion takes place between the roller and its core, separated by a layer of lubrication which prevents actual contact, greatly reducing friction. The teeth of the hub motor's planetary gears are replaced with roller bearings of the type used in bicycle chains, and the teeth of the inner and outer gears are replaced with teeth of the type used in bicycle sprockets, that will properly mesh with the rollers. Energy loss due to gear tooth friction should be substantially reduced and service life should be correspondingly increased. An example of this type of gear arrangement is found in U.S. Pat. No. 2,293,907 (LeBus). To reduce friction even further, the gear rollers themselves may have ball bearings.

The wheel hub 12 may incorporate an electronically controlled automatic air pressure regulator 86 to control gas pressure in the low pressure chamber 65 and hub protector 60. This enables the low pressure in the hub protector to act as an adjustable "trimmer" restoring force in addition to the restoring force provided by the stiffness of the sidewalls 20, 22 and outer ring 16.

The integrated wheel may have disc brakes. The discs may be attached to the rotating outer hub and the shoes may be attached to the stationary wheel axle 18. The disc brakes may serve as a backup for regenerative braking when the integrated wheel is used in an electric or hybrid vehicle.

A replaceable tread may be attached to the external surface of the outer ring 16. The replaceable tread may be made of rubber, high resiliency urethane or other material. It may be belted with poly-para phenylene terephthalamide or similar material for longer wear. The replaceable tread protects the outer ring from road wear and prolongs its life. Attachment methods such as beads, adhesive cement or vulcanization may secure the replaceable tread to the outer ring 16.

The widespread use of electric vehicles has been impractical in the past for two main reasons. The primary obstacle is lack of range due to inadequate battery capacity. However, even if battery capacity were adequate, the charging of these vehicles would severely tax household power circuits and in turn the entire electrical grid if implemented on a mass scale. Given that the aging US power grid has difficulty satisfying increasing demand as it is, if electric vehicles are to serve as a serious alternative to fossil fueled cars then a large increase in electric vehicle efficiency and range is clearly necessary. An automobile that not only has zero carbon emission as in electric vehicles, but is highly energy efficient, would be desirable. Combining the integrated wheel with existing automotive technologies should bring this goal within reach in the near future.

The integrated high efficiency wheel can be implemented on many different types of vehicles. The Neighborhood Electric Vehicle (NEV) is just one concept that works well with the present embodiment. An electric propulsion system for the NEV may consist of four integrated wheel units plus battery and a voltage control unit for each wheel. Rechargeable batteries (e.g. lithium ion, magnesium-water fuel cell or zinc-air fuel cell) supplemented by surface-mounted photovoltaic charger cells may provide power. For a 600 kg vehicle on a smooth level road with aerodynamic drag coefficient of 0.2, this combination of features may provide a range of approximately 12 miles per kilowatt-hour at a speed of 20 mph, and 8 miles per kwh at 30 mph. A 150 kg battery with energy storage density of 200 watt-hours per kilogram should provide a range of approximately 400 miles at 20 mph. A peak 400 watt photovoltaic charger would provide roughly 1 kwh per day, assuming 3 hours sun exposure per day, giving a range of 10 miles per day without charging from the power grid. Even an inexpensive lead-acid deep cycle battery should provide 80 to 100 mile range with such a vehicle. Added benefits of the present device, if used on a mass scale, are reductions in greenhouse gas emissions causing global warming, and reductions in oil imports to the developed world.

Although the above description contains many details, these should not be construed as limiting the scope of the embodiments but as describing only one of many possible embodiments.

The invention claimed is:

1. An automotive wheel comprising:
   (a) a wheel hub rotating about a wheel axle;
   (b) a multi chambered pneumatic tire encircling and attached to said wheel hub, the tire comprising:
      (i) a non-porous outer ring encircling said wheel hub and being radially spaced apart from said wheel hub, the outer ring comprising:
         at least one high pressure ring chamber; the at least one high pressure ring chamber encircling said wheel hub within the outer ring;
      (ii) a first sidewall and a second sidewall, whereby the outer ring is connected to said wheel hub, the sidewalls being axially spaced apart, each sidewall comprising:
         at least one high pressure sidewall chamber; the at least one high pressure sidewall chamber encircling said wheel hub within the sidewall;
      the sidewalls, the outer ring and said wheel hub enclosing a low pressure chamber.

2. The automotive wheel recited in claim 1, further comprising at least one ring restraint band encircling said wheel hub, the at least one ring restraint band being attached to the tire proximate the outer ring, the at least one ring restraint band being attached to said automotive wheel proximate said wheel hub, whereby the outer ring is positioned and restrained radially.

3. The automotive wheel recited in claim 2, further comprising a hub protector encircling said wheel hub within said low pressure chamber.

4. The automotive wheel recited in claim 2, further comprising an electric hub motor, whereby the wheel hub is driven in rotation about the axle.

5. The automotive wheel recited in claim 2, further comprising means for regulating gas pressure in said low pressure chamber, whereby the restoring force on the outer ring is controlled.

6. The automotive wheel recited in claim 2, wherein the outer ring contains closed cell foam.

7. The automotive wheel recited in claim 3, further comprising an electric hub motor, whereby the wheel hub is driven in rotation about the axle.

8. The automotive wheel recited in claim 3, further comprising means for regulating gas pressure in said low pressure chamber, whereby the restoring force on the outer ring is control led.

9. The automotive wheel recited in claim 3, wherein the outer ring contains closed cell foam.

10. The automotive wheel recited in claim 4, further comprising means for regulating gas pressure in said low pressure chamber, whereby the restoring force on the outer ring is controlled.

11. The automotive wheel recited in claim 4, wherein the outer ring contains closed cell foam.

12. The automotive wheel recited in claim 5, wherein the outer ring contains closed cell foam.

13. The automotive wheel recited in claim 7, further comprising means for regulating gas pressure in said low pressure chamber, whereby the restoring force on the outer ring is controlled.

14. The automotive wheel recited in claim 7, wherein the outer ring contains closed cell foam.

15. The automotive wheel recited in claim 8, wherein the outer ring contains closed cell foam.

16. The automotive wheel recited in claim 10, wherein the outer ring contains closed cell foam.

17. The automotive wheel recited in claim 13, wherein the outer ring contains closed cell foam.

18. An automotive wheel comprising:
   (a) a wheel hub rotating about a wheel axle;
   (b) a multi chambered pneumatic tire encircling and attached to said wheel hub, the tire comprising:
      (i) a non-porous outer ring encircling said wheel hub and being radially spaced apart from said wheel hub, the outer ring comprising:
         at least one high pressure ring chamber; the at least one high pressure ring chamber encircling said wheel hub within the outer ring;

(ii) a first sidewall and a second sidewall, whereby the outer ring is connected to said wheel hub, the sidewalls being axially spaced apart, each sidewall comprising:
  at least one high pressure sidewall chamber; the at least one high pressure sidewall chamber encircling said wheel hub within the sidewall;
the sidewalls, the outer ring and said wheel hub enclosing a low pressure chamber;

(c) at least one ring restraint band encircling said wheel hub within the low pressure chamber, the at least one ring restraint band being attached to the outer ring, the at least one ring restraint band being attached to said wheel hub, whereby the outer ring is positioned and restrained radially.

* * * * *